Mar. 3, 1925.

B. DE MATTIA

PROCESS OF AND APPARATUS FOR MANUFACTURING PNEUMATIC TIRES

Filed Aug. 6, 1921  2 Sheets—Sheet 1

INVENTOR
B. De MATTIA

Mar. 3, 1925.

B. DE MATTIA 1,528,659

PROCESS OF AND APPARATUS FOR MANUFACTURING PNEUMATIC TIRES

Filed Aug. 6, 1921 2 Sheets-Sheet 2

WITNESSES

INVENTOR
B. De MATTIA
BY
ATTORNEYS

Patented Mar. 3, 1925.

1,528,659

UNITED STATES PATENT OFFICE.

BARTHOLD DE MATTIA, OF CLIFTON, NEW JERSEY.

PROCESS OF AND APPARATUS FOR MANUFACTURING PNEUMATIC TIRES.

Application filed August 6, 1921. Serial No. 490,390.

*To all whom it may concern:*

Be it known that I, BARTHOLD DE MATTIA, a citizen of the United States, and a resident of Clifton, in the county of Passaic and State of New Jersey, have invented certain new and useful Improvements in Processes of and Apparatus for Manufacturing Pneumatic Tires, of which the following is a full, clear, and exact description.

The present invention relates to the manufacture of pneumatic tires and it has for its object a greatly simplified process of shaping and vulcanizing tires, and production of a simple means or apparatus for carrying out the process.

Briefly stated, the present invention may be said to consist of expanding and shaping a tire blank by hermetically sealing the space enclosed within the circumferential edges or beads, and utilizing the air enclosed therein to expand and inflate the tire blank directly within vulcanizing molds, and in vulcanizing the expanded and inflated tire while held in expanded and inflated condition within the said molds.

It further consists of simple means for closing the opening within the circumferential edges or beads of the tire blank, and for hermetically connecting the inner circumferential or beaded edges of the blank to such means whereby the tire blank forms in itself the outer circumferential wall of a sealed chamber.

The invention is illustrated in the accompanying drawings in which Fig. 1 shows, diagrammatically, the manner of assembling one of the closure plates and the beaded edge of a cylindrical tire blank, the closure plate being shown in perspective.

Similar reference characters will be employed to designate corresponding parts.

Figure 1:
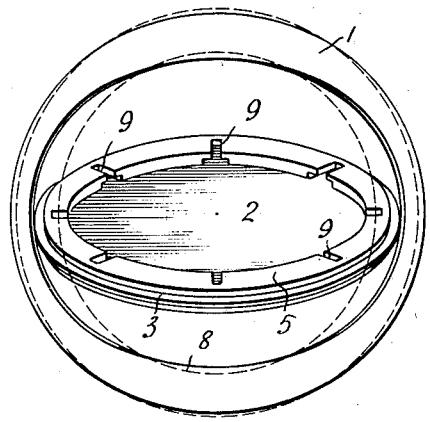
Figure 2:
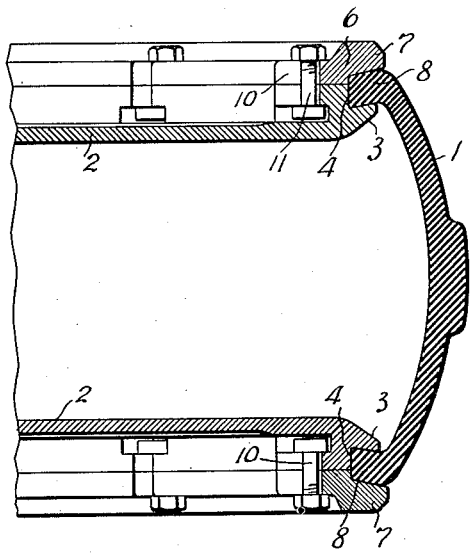
Fig. 2 shows a diametrical cross section through the edges of a portion of the closure plates, and a cross section through the portion of the tire blank connected therewith.

In the drawing 1 is a tire blank which will preferably be formed "flat" or as an open cylinder, although as will be hereinafter pointed out, my invention may be employed in expanding and vulcanizing tire blanks which have been partially shaped. The tire blank 1, is formed of green or unvulcanized rubber.

In carrying out my process the central space or opening within the tire blank 1 is closed by means of circular plates 2. These plates are of a diameter exceeding the opening within the beaded edges of the finished tire so that they will engage and shape the inner surface of the beaded edges. They are provided adjacent their peripheral edges with a recess formed by the flanges 3, and the shoulders 4. Upon their outer surfaces they are provided with a flat face or seat 5, against which a clamping ring 6, may be seated, the clamping ring 6, being provided with peripheral flanges 7 which, cooperating with the flanges 3, on the plates 2, receive and hermetically seal the beaded edges 8, of the tire blank to the sealing plates 2, as shown in the drawing.

Figure 3:
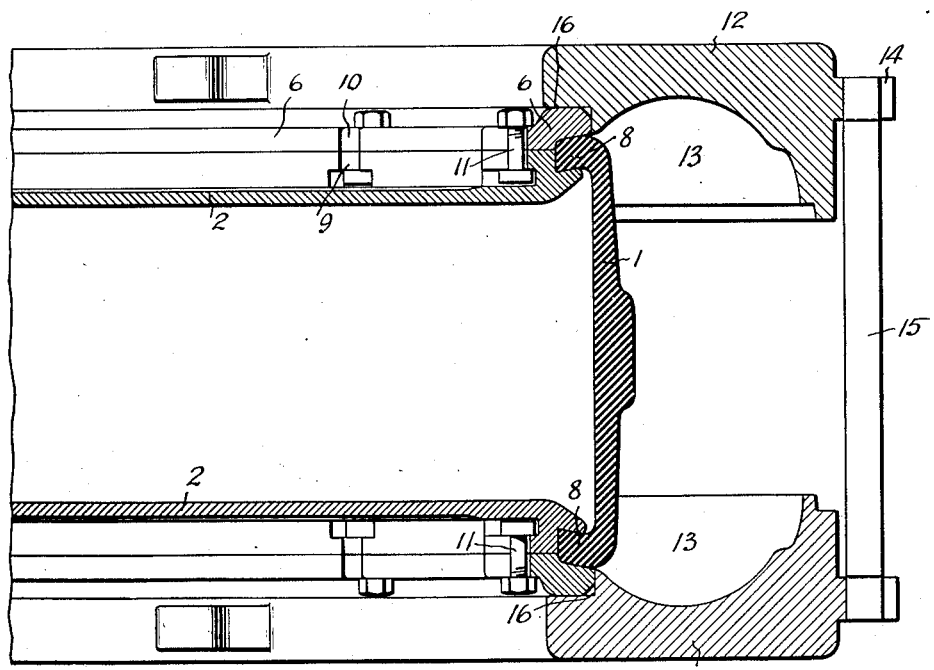
Fig. 3 shows a section of a portion of the closure plates and the tire blank connected, and also a cross section through a portion of the vulcanizing molds, the parts being in the position which they will occupy before the expanding and shaping of the tire blank.
Figure 4:
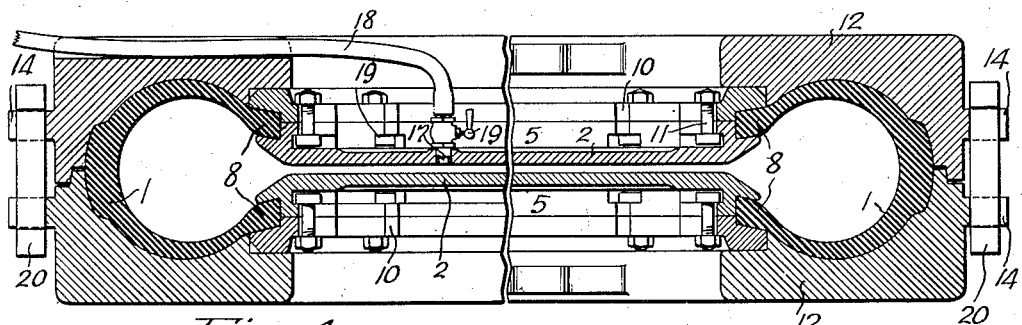
Fig. 4 shows a diametrical cross section through the closure plates, the tire blank and vulcanizing mold, after the parts have been operated to expand and shape the tire blank, and in the position which they will occupy during the vulcanizing operation.
Figure 5:
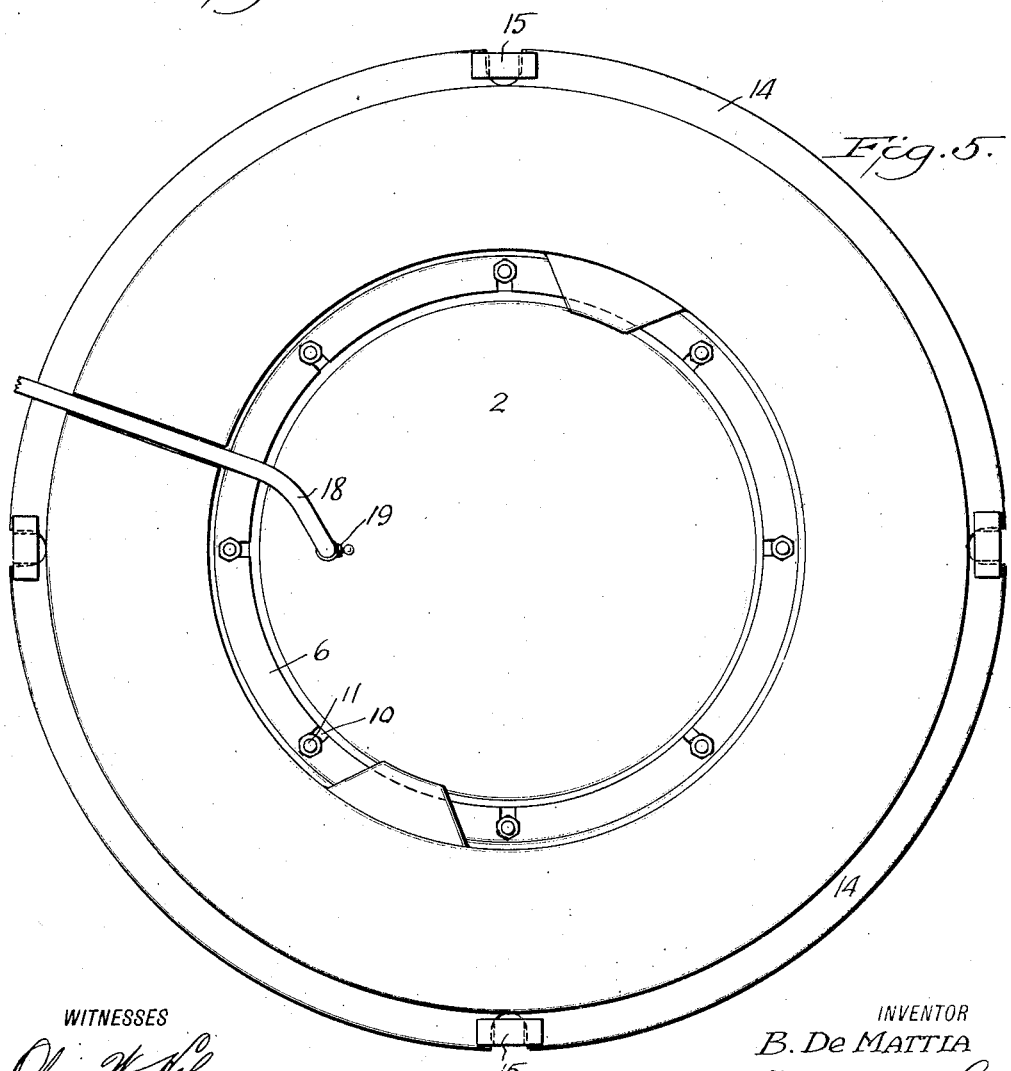
Fig. 5 is a top plan view of Fig. 4.

For the purpose of connecting the clamping rings 6, to the plates 2, the plates 2, are provided with undercut notches 9, and the clamping rings 6, are provided with notches 10, the undercut notches 9, receiving headed bolts 11, which also engage the notches 10, in the clamping rings. When the beaded edges 8, of the tire blank 1, are properly engaged between the shoulders 3 and 7 by tightening up the bolts 10, they will be compressed and shaped, and the tire blank will be hermetically sealed to the plates 2, thus confining between the plates 2 and the tire blank, a volume of air at normal atmospheric pressure. Obviously, if the plates 2, are forced towards each other the volume of air confined between the plates will be displaced radially, and will expand the tire blank. It is intended that the tire blank shall be inflated, expanded and shaped within the vulcanizing molds 12, and held therein during the vulcanizing process. The vulcanizing molds are of the usual circular form comprising two members provided with the shaping recesses 13, and upon the outer peripheries they are provided with notched flanges 14, arranged to be engaged by spacing bars 15, so as to hold the two members of the mold open, as shown in Fig. 3. Adjacent their inner peripheries the molds are provided with seats 16, into which the peripheral edges of the clamping rings 6, are received, so that when the parts are properly assembled and preliminary to the expanding and shaping of the tire, they will be as shown in Fig. 3 of the drawing. When thus assembled by moving the two sections of the molds towards each other, having removed the spacing bars 15, the volume of air contained within the tire blank and between the plates 2, will be displaced radially and cause the tire blank to be expanded within the mold, as shown in Fig. 4. The interior pressure of the air being almost wholly within the tire blank will of course impart to the blank sufficient pressure to shape the tire blank and to hold it in contact with the mold during the vulcanizing process.

It may be deemed advisable to vary the fluid pressure over that obtained by displacing the volume of air radially by the movement of the plates 2, towards each other, and for this purpose one of the plates may be provided with an air inlet as shown at 17, through which air may be introduced by means of a pipe 18, receiving air from any suitable source. The inlet 17, is provided with a valve 19, to control the pressure and the admission and release of air.

When the parts have been brought to the position shown in Fig. 4, locking bars 20, are engaged with the notched flanges 14, to hold the mold sections together with the enclosed shaped and expanded tire under compression while undergoing vulcanization. When the tire has been properly cured the molds will be opened and by loosening the bolts 11, the clamping rings and plates may be removed, leaving the tire of the desired shape and size.

By my process I not only insure the vulcanization of the tire immediately after its initial expanding and shaping, but I entirely do away with the necessity of employing inflatable inner tubes or cores, or mechanical devices for expanding and shaping the tire.

I claim:

1. The process of manufacturing tires, which consists in hermetically sealing both sides of an annular tire blank, expanding the said blank between vulcanizing and shaping molds, and vulcanizing the said blank while held expanded within said molds.

2. In an apparatus for manufacturing tires, means for clamping and hermetically sealing the inner or beaded edges of a tire blank said means being movable towards each other to displace the enclosed air.

3. In an apparatus for manufacturing tires, a vulcanizing mold comprising two sections, sealing plates, means to connect the sealing plates to the beaded edges of a tire blank, and means carried by the mold sections to receive and support the sealing plates.

4. In an apparatus for manufacturing tires, a sealing plate circular in form, a peripheral seat carried by said sealing plate to receive the beaded edge of a tire blank, and a clamping ring hermetically connecting the beaded edge of a tire blank to the sealing plate.

5. In an apparatus for manufacturing tires, a pair of circular sealing plates, and means for detachably clamping the said plates to the beaded edges of a tire blank to hermetically seal the tire blank.

BARTHOLD DE MATTIA.